Figure 1:
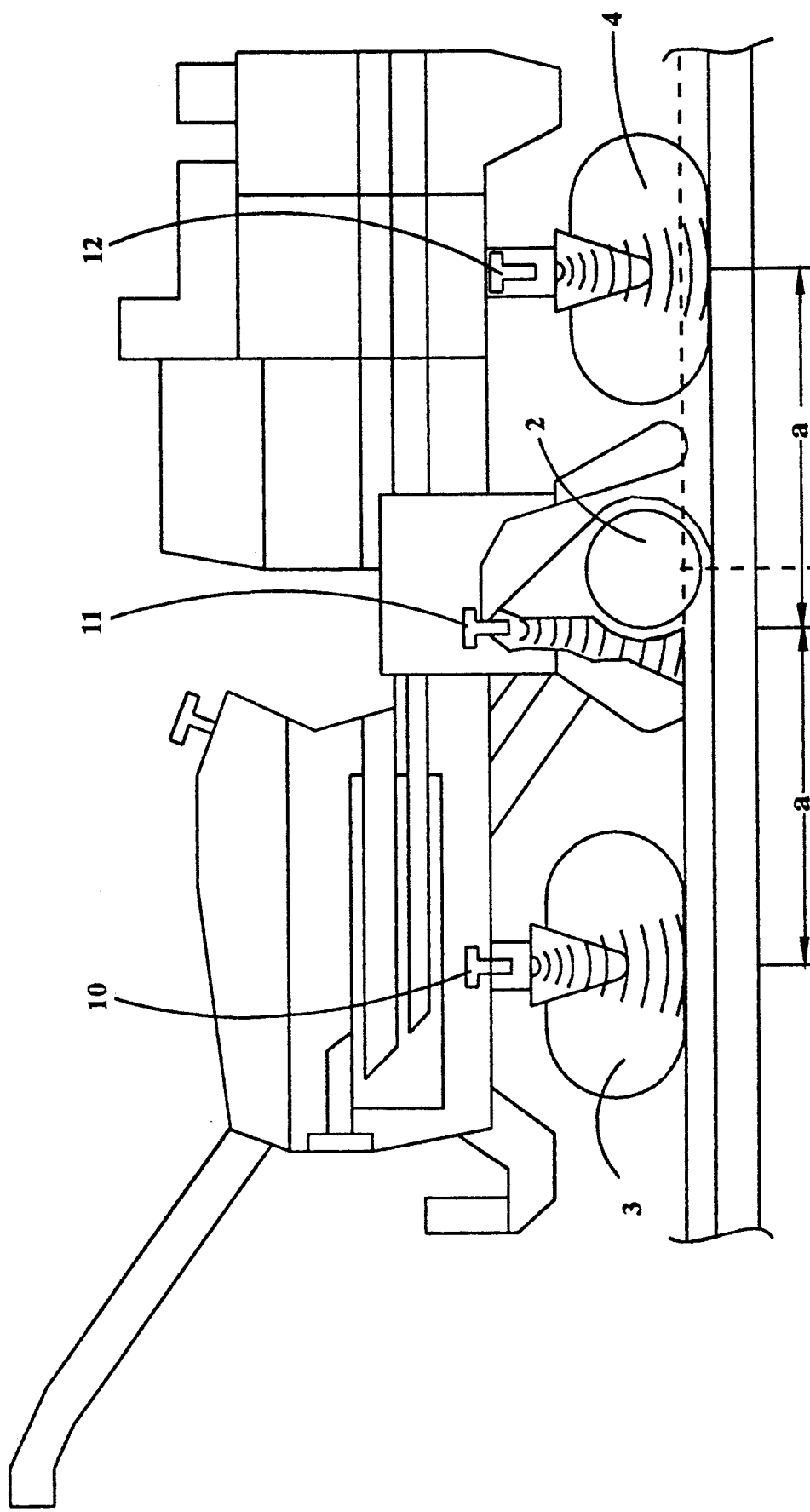

United States Patent [19]

Sehr et al.

[11] Patent Number: 5,309,407
[45] Date of Patent: May 3, 1994

[54] ULTRASONIC CONTROL UNIT FOR A TRAVELLING CUTTER

[75] Inventors: Willibald Sehr, Hadamar/Steinbach; Martin Zarniko, Diez, both of Fed. Rep. of Germany

[73] Assignee: Moba Electronic Gesellschaft für Mobil-Automation mbH, Elz, Fed. Rep. of Germany

[21] Appl. No.: 975,697

[22] Filed: Nov. 13, 1992

[30] Foreign Application Priority Data

Nov. 15, 1991 [DE] Fed. Rep. of Germany ... 9114281[U]

[51] Int. Cl.⁵ .............................................. E02F 3/84
[52] U.S. Cl. ................................... 367/96; 404/84.05
[58] Field of Search ................... 367/96, 99; 181/123; 404/84.05, 84.5; 172/4.5; 364/424.07

[56] References Cited

U.S. PATENT DOCUMENTS

| | | | |
|---|---|---|---|
| 4,041,623 | 8/1977 | Miller et al. | 172/4.5 |
| 4,473,319 | 9/1984 | Spangler | 172/4.5 |
| 4,573,124 | 2/1986 | Seiferling | 364/424.07 |
| 4,722,547 | 2/1988 | Kishi et al. | 280/707 |
| 4,924,374 | 5/1990 | Middleton et al. | 364/424.07 |
| 4,943,119 | 7/1990 | Zarniko et al. | 181/123 |
| 4,961,173 | 10/1990 | Sehr et al. | 367/96 |
| 5,009,546 | 4/1991 | Domenighetti et al. | 404/84.5 |
| 5,035,290 | 7/1991 | Harms et al. | 367/96 |

FOREIGN PATENT DOCUMENTS 3816198 9/1989 Fed. Rep. of Germany.
2123952 2/1989 United Kingdom.

*Primary Examiner*—Daniel T. Pihulic
*Attorney, Agent, or Firm*—Ralph H. Dougherty

[57] ABSTRACT

Apparatus for controlling the cutting depth of a road grooving machine by vertical adjustment of both the front and rear travelling gear on the basis of a cutting depth control signal, which is generated by a tracer ski by sampling a reference plane, including at least three ultrasonic sensors arranged one behind the other in the direction of movement of the cutter, and an evaluation means for determining the distances between the ultrasonic sensors and a reference plane to derive therefrom an inclination signal as well as an averaged distance signal. The evaluation means controls the height of the two travelling gears such that the average distance of the cutter drum as well as the position of the machine relative to the reference plane are adjusted.

5 Claims, 2 Drawing Sheets

ULTRASONIC CONTROL UNIT FOR A TRAVELLING CUTTER

The present invention relates to an ultrasonic control unit for a travelling cutter. In particular, the present invention deals with an improved control system for controlling the adjustment of the travelling gear of "pavement profilers" or road grooving machines.

In known road grooving machines, which are also referred to as pavement profilers, a rotatably supported cutter drum is fixed in position relative to the chassis of the pavement profiler or road grooving machine as far as its axis of rotation is concerned. The pavement profiler is provided with a front travelling gear and a rear travelling gear. The front travelling gear is adapted to be manually adjusted to a fixed height value. The rear travelling gear is equipped with a travelling gear height adjustment means, which is controlled in dependence upon a cutting depth control signal. The cutting depth control signal is supplied by a sensor, which is attached to the pavement profiler and which detects the height of the sensor relative to a reference plane, the reference plane being, for example, a marginal strip of the road surfacing to be removed by cutting. Typically, such a sensor is defined by a "tracer ski" guided mechanically over the reference plane; in so doing, a potentiometer signal representative of the height level of the tracer ski can be used as a cutting depth control signal, which is supplied to the travelling gear height adjustment means. Typically, the sensor is arranged directly adjacent to cutter drum. In view of the fact that this is frequently impossible due to construction or application-dependent limitations, the sampling, or height detection, is often carried out a short distance in front of the cutter drum, when seen in the direction of motion. When, due to the readjustment of the travelling gear height of the rear travelling gear, the cutter is brought to an angular inclined position relative to the generally horizontal reference plane, the forward displacement of the sensor relative to the point of application of the cutter drum will cause a geometry fault, which makes the depth control of the cutter drum work inaccurately.

An additional problem arising in the operation of known pavement profilers or road grooving machines is because the reference plane frequently deviates from an ideal flat surface. Typically, waviness will occur in the course of the reference plane. This wavy reference plane is detected by the tracer ski in a correspondingly wavy shape so that the cutting operation will, in turn, result in a wavy pattern.

U.S. Pat. No. 4,961,173 discloses an ultrasonic control unit for a travelling construction machine provided with a plurality of ultrasonic sensors, which are arranged in closely spaced, juxtaposed relationship and by means of which a guide rope can be sampled for effecting e.g. lateral guidance or height guidance of a road grooving machine.

It is the principal object of the present invention to provide an ultrasonic control unit for a travelling cutter, which permits a more accurate adjustment of the desired cutting depth.

Figure 2:
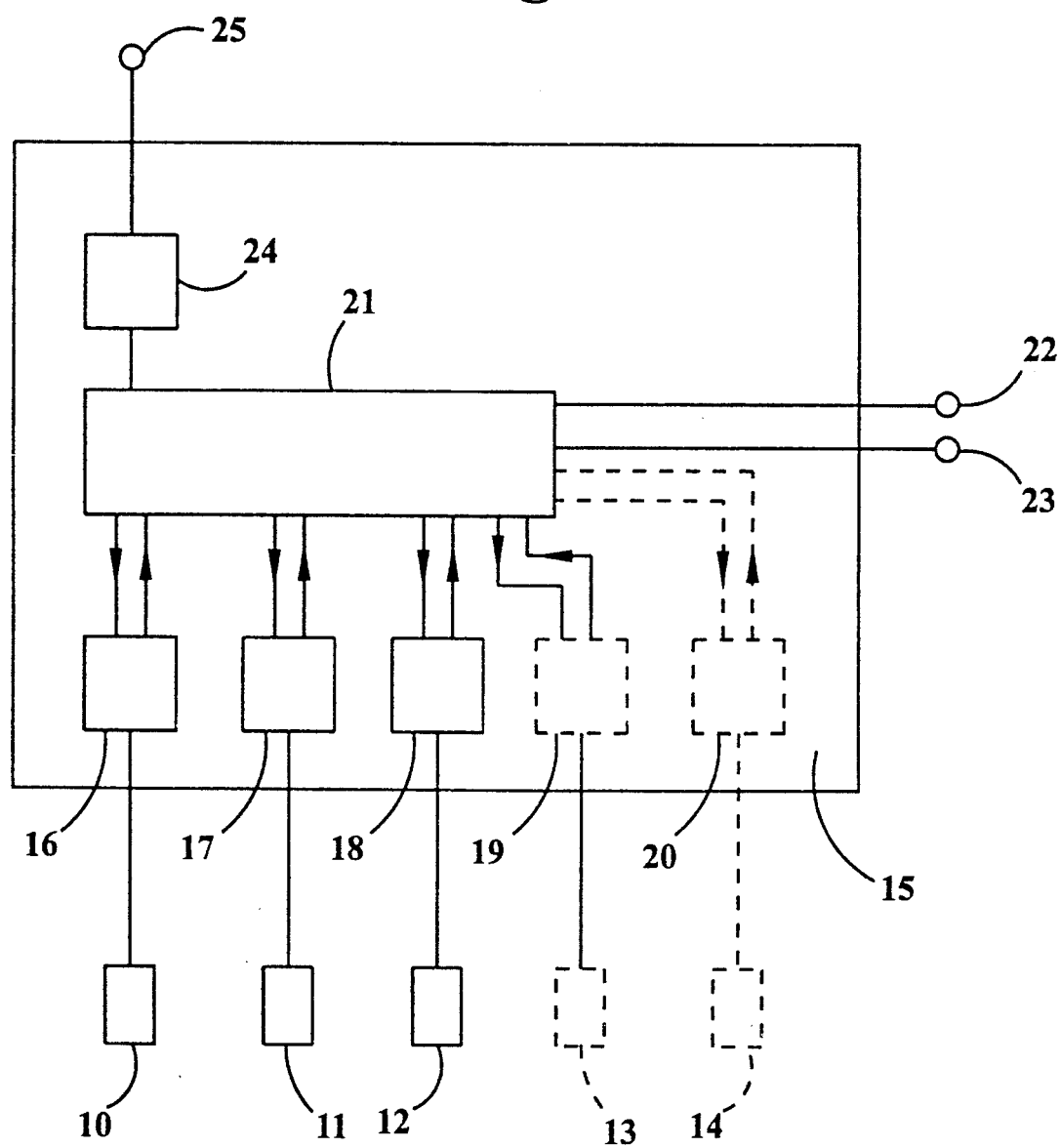

A preferred embodiment of the ultrasonic control unit according to the present invention will be more readily understandable with reference to the following detailed description and the appended drawings, in which:

FIG. 1 is a schematic side view of a road grooving machine provided with one embodiment of the ultrasonic control unit according to the present invention; and FIG. 2 is a block diagram of the ultrasonic control unit according to the present invention.

As can be seen in FIG. 1, the road grooving machine 1, has a cutter drum 2, which is rotatably supported on the road grooving machine, as well as front and rear travelling gears 3, 4. The front travelling gear 3 as well as the rear travelling gear 4 are secured to the road grooving machine 1 with the aid of travelling gear height adjustment means (not shown). For the purpose of automatically adjusting the height of the rear travelling gear, such a travelling gear height adjustment means, which is typically constructed as an electrohydraulic adjustment means, is known per se. In the present invention, such a travelling gear height adjustment means can also be used for the front travelling gear 3 so that a detailed description of the structural design of the travelling gear height adjustment means is not necessary here.

In accordance with the present invention, the ultrasonic control unit comprises at least three ultrasonic sensors 10, 11, 12, which are arranged one behind the other essentially in the direction of movement of the road grooving machine 1 in such a way that a reference plane can be sampled by their sound cones. The reference plane to be sampled is normally a marginal strip of a road whose surfacing has to be removed by cutting down to a predetermined depth. The ultrasonic sensors 10, 11, 12 are, in any case, spaced apart to such an extent that their sound cones will not overlap one another at the location of the reference surface to be sampled.

In the preferred embodiment of the present invention of the type shown in FIG. 1, the ultrasonic control unit only comprises the three ultrasonic sensors 10, 11, 12 which are shown in the figure and which are attached to the road grooving machine 1 on the same level and at identical distances a from one another. The advantages of this type of arrangement of the ultrasonic sensors will be evident to the person skilled in the art from the description of signal processing following below.

The block diagram of the ultrasonic control unit is shown in FIG. 2. The ultrasonic sensors 10, 11, 12 as well as, optionally, additional ultrasonic sensors 13, 14 are connected to a computing unit 21 via adequate transmitting and receiving circuits 16, 17, 18 as well as, optionally, circuits 19, 20, the computing unit 21 defining together with the transmitting and receiving circuits an evaluation means 15. The computing unit 21 provides at its outputs 22, 23 control signals for the travelling gear height adjustment means for effecting a vertical adjustment of the travelling gears 3, 4.

An analog-to-digital converter 24 is positioned between the input 25 for a nominal cutting depth signal and the computing unit 21.

The computing unit causes the ultrasonic sensors 10 to 12 (and, optionally, 13, 14) to be activated cyclically for a sequential transmission of ultrasonic pulses, the transit time from the respective transmission of an ultrasonic pulse to the reception of the echo reflected by the reference plane being measured by the same ultrasonic sensor which transmitted the pulse. On the basis of this transit time, the computing unit 21 will determine the distance s1, s2, s3 between each ultrasonic sensor 10, 11, 12 and the reference surface. Then the evaluation means examines whether each of the distances measured can be acknowledged as a valid measurement, or whether it must be rejected as faulty measurement.

A distance will be rejected as faulty measurement if the measuring point in question lies more than a predetermined distance outside of the plane which is determined by the measuring points associated with the other distances.

In the preferred embodiment, where three ultrasonic sensors 10, 11, 12 are attached to the road grooving machine 1 on one level and at identical distances from one another, the detection of faulty measurements can be carried out by simply forming a difference. In this case, the computing unit 21 forms the differences d12, d13, d23 between two distances s1 and s2, or s1 and s3, or s2 and s3 in each case. The distances which are classified as valid distances are those whose difference is smaller than a predetermined limit value representing the admissible waviness of the reference plane. If, for example, one of the three sensors detects an obstacle, e.g., in the form of a stone, lying on the reference plane, the distance in question (which is assumed to be the distance s3 in the present case) will be shorter than the other two distances s1, s2 by the height of this obstacle. In this instance, the difference d12 will essentially be equal to zero and, consequently, it will be smaller than a predetermined limit value, whereas the differences d13 and d23 exceed the limit value. Hence the evaluation means will reject the third distance s3 as faulty measurement. Subsequently, the average distance dm will be calculated in accordance with the following relationship average value of the distances classified as valid distances:

$$dm = (s1 + s2) / 2$$

As soon as the obstacle is no longer within the detection range of the third ultrasonic sensor 12, all the differences d12, d13, d23 will be smaller than the limit value. Now, the evaluation means. Will not reject any of the distances as faulty measurement. Hence, the average value will be calculated in accordance with the following formula:

$$dm = (s1 + s2 + s3) / 3$$

On the basis of the given nominal value or rather the nominal cutting depth, the average distance dm to the reference Plane and the inclination of the cutter (in the direction of motion) relative to the reference plane, the evaluation unit forms the control signals for the vertical adjustment of the front as well as of the rear travelling gear height adjustment means so that the height and the parallelism of the cutter are adjusted.

The invented ultrasonic control unit for a travelling cutter avoids cutting depth faults caused by an undesirable angle of inclination of the travelling cutter relative to the reference plane, it compensates substantially for the waviness of the reference plane, and it facilitates the work of the operator of the road grooving machine by holding the road grooving machine in a parallel position. Obstacles on the reference plane are recognized by the invented ultrasonic control unit by detection of the respective faulty measurements so that such obstacles will not impair the accuracy of cutting depth adjustment.

What is claimed is:

1. An ultrasonic control unit for a travelling road grooving machine (1) comprising a cutter drum (2), which is supported for rotation relative to said road grooving machine (1), and front and rear travelling gears (3, 4), one (4) of said travelling gears being provided with a first travelling gear height adjustment means controlled in dependence upon a cutting depth control signal, characterized in that:
   the other traveling gear (3) is provided with a second travelling gear height adjustment means;
   at least three ultrasonic sensors (10, 11, 12) are arranged on the road grooving machine (1) one behind the other essentially in the direction of motion of said road grooving machine (1);
   an evaluation means (15) is provided for detecting the distances (s1, s2, s3) between the ultrasonic sensors (10, 11, 12) and a reference surface on the basis of ultrasonic sensor signals of said ultrasonic sensors (10, 11, 12);
   that the evaluation means (15) being adapted to derive from said measured distances (s1, s2, s3), on the one hand, an inclination signal representing the angle of inclination of the cutter (1) relative to the reference surface and, on the other hand, an averaged distance signal (dm); and
   the evaluation means (15) being further adapted to derive control signals for the two travelling gear height adjustment means from said averaged distance signal (dm), from the inclination angle, and from a nominal cutting depth which can be adjusted.

2. An ultrasonic control unit according to claim 1, characterized in that, for readjusting the cutting depth, both travelling gear height adjustment means are acted upon by codirectional control signals, which depend on said averaged distance signal (dm).

3. An ultrasonic control unit according to claim 1, characterized in that, for readjusting the angle of inclination of the road grooving machine () relative to the reference surface, both travelling gear height adjustment means are acted upon by contradirectional control signals, which are derived from the inclination signal.

4. An ultrasonic control unit according to claim 1, characterized in that the evaluation means (15) will reject one of the measured distances (s1, s2, s3) as faulty measurement. if the measuring point in question lies more than a predetermined distance outside of the plane which is determined by the measuring points associated with the other distances; and
   the evaluation means (15) will calculate the averaged distance signal by averaging only on the basis of the distances (s1, s2, s3) which have not been rejected as faulty measurements.

5. An ultrasonic control unit according to claim 1, characterized in that the ultrasonic sensors (10, 11, 12) are attached to the road grooving machine (1) on a respective known level and at known distances (a) from one another;
   the evaluation means (15) determines the differences (d12, d13, d23) between two distances (s1, s2; s1, s3; s2, s3) in each case,
   the evaluation means (15) classifies the distances (s1, s2) whose difference (d12) is smaller than a limit value as valid distances; and
   the evaluation means (15) calculates the average distance (dm) as an average value of the distances (s1, s2) classified as valid distances.

* * * * *

UNITED STATES PATENT AND TRADEMARK OFFICE
CERTIFICATE OF CORRECTION

PATENT NO. : 5,309,407
DATED : May 3, 1994
INVENTOR(S) : Sehr et al.

It is certified that error appears in the above-indentified patent and that said Letters Patent is hereby corrected as shown below:

Column 3, line 39, change "the evaluation means. Will not reject" to -- the evaluation means Will not reject.

In the Claims:

Claim 3, line 3 (column 4, line 38), change "()" to -- (1) --.

Signed and Sealed this

Twenty-seventh Day of October, 1998

Attest:

BRUCE LEHMAN

Attesting Officer     Commissioner of Patents and Trademarks